US006319444B1

United States Patent
Kirk (10) Patent No.: US 6,319,444 B1
(45) Date of Patent: *Nov. 20, 2001

(54) MOLDED INSULATION PRODUCTS AND THEIR MANUFACTURE USING CONTINUOUS-FILAMENT WOOL

(75) Inventor: Simon R. Kirk, Berstett (FR)

(73) Assignee: Owens Corning Fiberglas Technology, Inc., Summit, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/319,398

(22) PCT Filed: Dec. 1, 1997

(86) PCT No.: PCT/US97/21794

§ 371 Date: Sep. 7, 1999

§ 102(e) Date: Sep. 7, 1999

(87) PCT Pub. No.: WO98/24615

PCT Pub. Date: Jun. 11, 1998

Related U.S. Application Data (60) Provisional application No. 60/032,596, filed on Dec. 2, 1996.

(51) Int. Cl.[7] .............................. B29C 43/02; B29C 67/00
(52) U.S. Cl. ..................... 264/136; 264/257; 264/319; 264/325
(58) Field of Search ................................. 264/136, 137, 264/257, 319, 325; 422/179, 180; 181/222, 252, 258, 294

(56) References Cited

U.S. PATENT DOCUMENTS

| | | | | |
|---|---|---|---|---|
| 2,590,221 | * | 3/1952 | Stevens | 156/196 |
| 3,054,714 | * | 9/1962 | Johnston | 156/212 |
| 3,442,751 | | 5/1969 | Langlois . | |
| 3,613,830 | * | 10/1971 | Hubbell, III | 138/115 |
| 3,619,322 | * | 11/1971 | Fleissner | 156/282 |
| 3,880,795 | | 4/1975 | Lundmark . | |
| 3,880,975 | * | 4/1975 | Lundmark | 264/119 |
| 3,955,643 | * | 5/1976 | Clark | 181/248 |
| 4,111,744 | * | 9/1978 | Reiniger | 162/100 |
| 4,379,101 | * | 4/1983 | Smith | 264/40.3 |
| 4,569,471 | * | 2/1986 | Ingemansson et al. | 228/176 |
| 4,609,519 | * | 9/1986 | Pichard et al. | 264/510 |
| 4,615,717 | * | 10/1986 | Neubauer et al. | 65/479 |
| 4,774,985 | * | 10/1988 | Broadbelt et al. | 141/12 |
| 4,795,517 | * | 1/1989 | Elliott et al. | 156/221 |
| 5,290,522 | * | 3/1994 | Rogers et al. | 422/179 |
| 5,418,339 | * | 5/1995 | Bowen et al. | 181/230 |
| 5,545,279 | * | 8/1996 | Hall et al. | 156/201 |
| 5,766,541 | | 6/1998 | Knutsson et al. . | |
| 5,976,453 | | 11/1999 | Nilsson et al. . | |
| 6,068,082 | | 5/2000 | D'Amico, Jr. et al. . | |

FOREIGN PATENT DOCUMENTS

| | | |
|---|---|---|
| 2117019 | 7/1994 | (CA) . |
| 615 014 | 9/1994 | (EP) . |
| 692 616 | 1/1996 | (EP) . |

OTHER PUBLICATIONS

U.S. application No. 08/802,492, Kirk, filed Feb. 20, 1997, pending.

Jaques Gerard, Composites, La Technologie P–4 D'Owens–Corning.

* cited by examiner

Primary Examiner—Jan H. Silbaugh
Assistant Examiner—Stefan Staicovici
(74) Attorney, Agent, or Firm—Inger H. Eckert (57) ABSTRACT

A process of forming a thermal insulation layer (34) includes advancing a multifilament strand of continuous filaments (12) through a nozzle (10) to separate the filaments (16) from each other to form a continuous-filament wool (14), applying a binder to the filaments, placing a charge comprising the wool in a mold (32), and molding the charge to form an insulation layer (34). In a preferred embodiment, the charge (30) further comprises a container, such as a bag (24) formed from a poylmer film. The filaments are preferably prepared from a high-strength, high-temperature resistant glass material. The molded wool is advantageously used to manufacture products, such as catalytic converters (46) wherein the wool is used to thermally insulate the catalytic core element (48).

10 Claims, 4 Drawing Sheets

MOLDED INSULATION PRODUCTS AND THEIR MANUFACTURE USING CONTINUOUS-FILAMENT WOOL

This application is a national stage of PCT/US97/21794 filed Dec. 1, 1997 which claims benefit of Provisional Application Ser. No. 60/032,596 filed Dec. 2, 1996.

TECHNICAL FIELD AND INDUSTRIAL APPLICABILITY OF THE INVENTION

The invention relates to insulation products suitable for use as acoustical or thermal insulation, and to methods for making such products. In one of its aspects, the invention pertains to molding fibrous material to make thermal and acoustical insulation products. In another of its aspects, the invention pertains to insulation products made by molding fibrous material. In yet another aspect, the invention relates to making fibrous products. The invention is particularly useful in making thermal insulation for high-temperature objects, such as catalytic converters.

BACKGROUND OF THE INVENTION

Fibrous materials are used for numerous industrial purposes, such as for making insulation products, structural products, reinforcement products, and decorative products. Insulation products include thermal insulation products, which block heat flow, and acoustical insulation products, which can have either a sound-barrier quality to block the transmission of sound or a sound-absorptive quality to dissipate or absorb sound, or both a sound-barrier quality and a sound-absorptive quality. Fibrous thermal and acoustical insulation products are commonly made from relatively short fibers in the form of a wool. For example, building insulation is typically fibrous glass wool. Glass wool fibers have an average length significantly less than about 1 cm, and an average diameter of about 4 to about 20 microns. Glass wool is typically made in a rotary process by centrifuging molten glass from a rotating centrifuge or spinner. The rotary process has great variability, resulting in wide ranges in the length and diameter of glass fibers. Besides glass fibers, other inorganic and organic fibers can be made using the rotary process.

Continuous inorganic fibers are typically made from stationary multi-holed bushings, whereas continuous organic fibers are usually made from stationary spinnerets. In either case, fibers are made by mechanically pulling or attenuating the fibers from molten material. Continuous fiber-forming processes are operated under closely controlled conditions, and the fibers have generally constant, uniform diameters. Continuous fibers are formed individually, and are gathered and collected as a multifilament strand of continuous filaments. The fibers are long, and can be considered to be unending (i.e., the fibers have an essentially infinite length) unless broken. Generally, continuous fibers have strengths several orders of magnitude greater than those of rotary fibers, but the manufacturing cost for rotary fibers is significantly less than the cost for continuous fibers. An important advantage of continuous fibers is that the continuous fiber process can operate at higher temperatures. Therefore, the fibrous materials making up the continuous fibers can have higher softening points and can operate at higher service temperatures than possible with the rotary wool materials. For example, E-glass fibers can be made using the continuous fiber process, but not with a rotary process.

One of the uses for the discrete-length inorganic wool fibers produced by the rotary process is in molded wool products. For example, glass wool having about 20 percent by weight organic binder is molded into pipe insulation for its thermal insulation value. Glass wool is also molded into acoustical insulation products, such as appliance insulation and automobile headliners. Further, glass wool can be molded into products having an important structural utility, such as glass wool window lineals.

One of the characteristics of molded rotary glass wool products is that high amounts of binder are required for desired product qualities. From a cost and an environmental standpoint it would be advantageous to be able to reduce the amount of binder in molded products. Another characteristic of molded rotary wool products is that since the glass wool is made of short fibers, during product use some of the fibers can become separated and become airborne. It would be beneficial if the rotary fibers could be bound up or prevented from being dislodged, especially since some of the dislodged fibers could be small enough in diameter to become inhaled during human respiration. The problem of dislodged or separated fibers is particularly troublesome where the molded wool product is subjected to mechanical or pneumatic pulsing or shock, such as a severe vibration during the service of the product.

Under conventional molding processes for products where the dislodging or separating of discrete fibers from the molded product is a concern, the edges of the molded product have been typically molded with a greater density than the average density of the product. The use of a greater density at the edges helps bind the product to prevent dislodging of the fibers. Some fibrous wool molding processes provide for densities in the edges of the product approaching or exceeding 200 percent of the average density of the product, which can necessitate the use of large amounts of wool in the edges.

In an attempt to overcome some of the drawbacks of rotary wool products, a wool-like material has been developed using continuous fibers. This material, referred to as continuous-filament wool, has the advantage of incorporating fibers so long that they can be considered to be essentially unending. The long nature of the fibers substantially decreases the amount of free fibers that can become dislodged from the product, even under extreme service conditions. Also, the continuous fibers have a controlled diameter, which can be set to be above the human-respirable range.

Acoustical insulation for filling automobile muffler shells is a known example of continuous-filament wool made from continuous fibers. Such a wool product is described in U.S. Pat. No. 4,569,471 to Ingemansson et al., the disclosure of which is hereby incorporated by reference. This patent discloses a process for filling muffler shells by advancing a multifilament strand of continuous filaments through a nozzle to separate the filaments from each other to form a continuous-filament wool. The glass wool in the muffler shell absorbs some of the sound energy, thereby appreciably reducing the noise of the engine. The continuous-filament wool is blown by the nozzle directly into the muffler shell, which is perforated to allow separation and evacuation of the air traveling with the fibers. Another advantage of the continuous-filament wool process is that the filaments can be made of a material having a higher softening point than possible with rotary-produced fibers. A problem of the continuous-filament wool collection process is that the density is limited to that which is possible by intercepting air-borne fibers in a perforated container.

An improvement in the use of continuous-filament wool as an acoustical absorber in automobile mufflers is disclosed in European Patent Publication No. EP 0692616 A1, published Jan. 17, 1996, the disclosure of which is hereby incorporated by reference. The continuous-filament wool process can be used to make an acoustical insulation in a separate perforated collection device rather than in the muffler. A binder material can be added as the filaments are drawn through a nozzle, and the wool with the binder can be heated in the perforated collection device to set or cure the binder, thereby making a rigid acoustical insulation product suitable for insertion in a muffler. This process has the disadvantage, however, that the density cannot be any greater than that which is possible by intercepting air-borne fibers in a perforated container.

SUMMARY OF THE INVENTION

One object of the invention is to develop advantageous forms of continuous-filament wool products and methods for producing them that overcome drawbacks of known methods. Also, an object of the invention is to develop advantageous ways of forming and collecting continuous-filament wool. Another object is to develop such products and methods such that they take advantage of the attributes of the continuous fibers from which the continuous-filament wool is derived, e.g., higher softening point material, very long or nearly infinite fiber length, uniform fiber diameter, easy and accurate control of binder on the fibers, and relatively high fiber strength.

Such objects and advantages are achieved by a method of forming a thermal insulation layer which includes advancing a multifilament strand of continuous filaments through a nozzle to separate the filaments from each other to form a continuous-filament wool, placing the continuous-filament wool in a mold with a binder material on the filaments, and molding the continuous-filament wool with the binder to form the insulation layer. The insulation produced by such a method can be used to thermally insulate an object, where the object, when in use, has a temperature of at least about 500° C., by placing the continuous-filament wool insulation around the object, where the filaments are composed of a material having a softening point of at least about 700° C. Thus, one aspect of the invention is directed to a molded thermal insulation material comprising a continuous-filament wool.

Yet another aspect of the invention relates to a molded acoustical insulation material comprising a continuous-filament wool which is compression molded.

A further aspect of the invention relates to a catalytic converter comprising a core element through which gases can flow in contact with a catalyst therein, and a molded thermal insulation material comprising a continuous-filament wool.

An additional aspect of the invention is directed to a method of making a charge for a molding process comprising advancing a multifilament strand of continuous filaments through a nozzle to separate the filaments from each other to form a continuous-filament wool, applying a binder material to the filaments as the filaments advance through the nozzle, and collecting the continuous-filament wool in a container, such as a bag, suitable for storing the wool prior to molding.

Yet another aspect of the invention relates to a method of making an insulation product comprises advancing a multifilament strand of continuous filaments through a nozzle to separate the filaments from each other to form a continuous-filament wool, distributing the continuous-filament wool across a collection surface, and collecting the continuous-filament wool as a continuous blanket on the collection surface.

A still further aspect of the invention relates to a method of making a fibrous product comprising advancing a multifilament strand of continuous filaments through a nozzle to separate the filaments from each other to form a continuous-filament wool, distributing the continuous-filament wool on a collection surface, and collecting the continuous-filament wool as a continuous-filament wool mat on the collection surface.

According to the invention, a thermal insulation layer may be advantageously made by a process comprising advancing a multifilament strand of continuous filaments through a nozzle to separate the filaments from each other to form a continuous-filament wool, placing the continuous-filament wool in a mold and adding a binder material to the filaments, and molding the continuous-filament wool to form an insulation layer. Preferably, the binder material is applied to the filaments as the filaments advance through the nozzle. In another preferred embodiment, the binder material is applied to the filaments after the continuous-filament wool is placed in the mold. Preferred filaments are composed of a glass material having a softening point of at least about 700° C. Preferably, the step of placing the continuous-filament wool in the mold is effected by placing a charge of the wool contained in a bag into the mold. Preferably, the molding step is carried out by compression molding. The continuous-filament wool is preferably molded to a fiber density providing sufficient filament-to-filament interaction to prevent loss of the continuous filaments under adverse service conditions of vibration and gas pulsing, where rotary wool molded to that same density would not have sufficient filament-to-filament interaction to prevent loss of the discrete fibers of the rotary wool under the same adverse service conditions of vibration and gas pulsing.

The invention is also directed to a molded thermal insulation material comprising a continuous-filament wool made by such a process. Furthermore, the invention is directed to a method of thermally insulating an object having a use temperature of at least about 500° C., the method comprising placing such a continuous-filament wool around the object, where the filaments are composed of a material having a softening point of at least about 700° C. Preferably, the continuous-filament wool is compression molded prior to being placed around the object. The molded thermal insulation material preferably has a binder content of no more than about 5 percent by weight and a density within the range of from about 4 to about 20 pounds per cubic foot (64 to 320 g/l).

The invention is also directed to a molded acoustical insulation material comprising such a continuous-filament wool which is compression molded. Preferably, the molded insulation material has a binder content of no more than about 5 percent by weight and a density within the range of from about 4 to about 20 pounds per cubic foot (64 to 320 g/l). The molded acoustical insulation material is preferably formed to have edges, with the density of the continuous filament wool at the edges of the molded acoustical insulation material being no more than about 150 percent of the average density of the molded acoustical insulation material.

In one embodiment of an application of molded insulation according to the invention, a catalytic converter comprises a core element containing catalyst material through which gases can flow in contact therewith, and a molded thermal insulation material comprising a continuous-filament wool. Preferably, the filaments of the continuous-filament wool are composed of a material having a softening point of at least about 700° C. The continuous-filament wool is preferably compression molded.

The invention is also directed to a process of making a charge for a molding procedure comprising advancing a multifilament strand of continuous filaments through a nozzle to separate the filaments from each other to form a continuous-filament wool, applying a binder material to the filaments as the filaments advance through the nozzle, and collecting the continuous-filament wool in a container suitable for storing the wool prior to molding. Preferably, the container is a bag suitable for being placed in a mold with the charge contained within the bag. The container is preferably perforated so that air can be separated from the continuous filament wool as it is being collected.

The invention is also directed to a process of making an insulation product comprising advancing a multifilament strand of continuous filaments through a nozzle to separate the filaments from each other to form a continuous-filament wool, distributing the continuous-filament wool across a collection surface, and collecting the continuous-filament wool as a continuous blanket on the collection surface. The process preferably further includes cutting the continuous blanket to make an insulation product of a predetermined shape. Preferably, the insulation product is molded into a predetermined shape to form a molded insulation product. The molded insulation product preferably has edges such that the density of the molded insulation product at the edges is less than about 150 percent of the average density of the molded insulation product. The process preferably includes applying a binder material to the filaments as the filaments advance through the nozzle, although in one preferred embodiment the continuous filament wool is binderless. Also, a binder material may be applied to the continuous blanket after it is collected on the collection surface. In a preferred embodiment, the continuous blanket has a binder content of no more than about 4 percent by weight and a density within the range of from about 6 to about 15 pounds per cubic foot (96 to 256 g/l). The blanket may be continuously molded to form a molded product of constant cross-sectional shape. In a preferred embodiment, the blanket is continuously encapsulated in encapsulation material to form an encapsulated blanket, which is then cut into lengths suitable for packaging.

The invention is further directed to a process of making a fibrous product comprising advancing a multifilament strand of continuous filaments through a nozzle to separate the filaments from each other to form a continuous-filament wool, distributing the wool on a collection surface, and collecting the wool as a continuous-filament wool mat on the collection surface. The mat may be a preform suitable for molding into a molded insulation product or a preform suitable for reinforcing a molded product. In a preferred embodiment, the process comprises applying a binder material to the filaments as they advance through the nozzle. The binder material may also be applied to the wool mat after it is collected on the collection surface. Alternatively, the continuous-filament wool may be binderless.

These and other aspects and embodiments of the invention are described in detail below in reference to the appended drawings.

DETAILED DESCRIPTION AND PREFERRED EMBODIMENTS OF THE INVENTION

Figure 1:
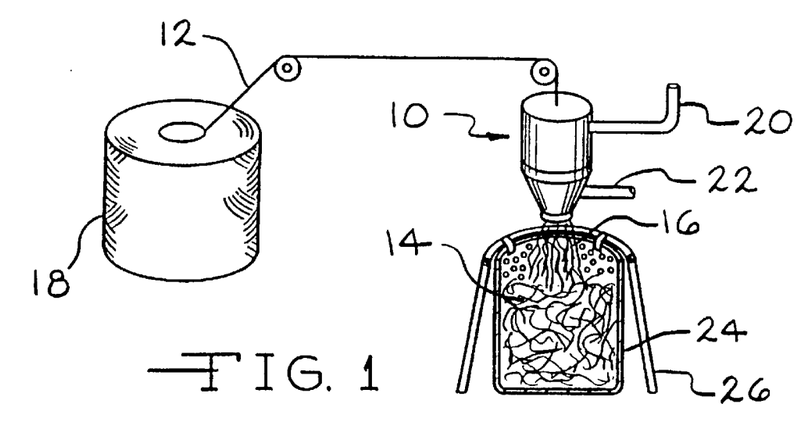
FIG. 1 is a schematic view in perspective of a process according to the invention for making continuous-filament wool from a roving package.

As shown in FIG. 1, a nozzle 10 is positioned to receive a strand 12 and to convert it into a mass of continuous-filament wool 14. The strand can be any multifilament strand that can be separated into individual filaments 16 by the nozzle. The strand can be supplied from any source, such as a roving package 18 or another type of package, or a continuous, in-line feed from a continuous fiber-forming process (not shown). The strand is pulled through the nozzle 10 by a jet of air or other fluid supplied at high pressure to the nozzle by air supply 20. The turbulence in the nozzle causes the filaments 16 to separate from each other, forming the continuous-filament wool 14. The nozzle can be driven by air or some other pressurized gas, or could be provided with another form of energy, such as sonic energy, to separate the filaments of the strand from each other. The operation of a nozzle to separate multifilament strand into continuous-filament wool may be as described in U.S. Pat. No. 4,569,471.

A binder material can be introduced into the nozzle via binder conduit 22 to add binder to the surface of the individual filaments 16. For applications where it is not important that the binder be in place during the intended use of the product (such as an operation where the continuous-filament wool is contained within a cavity or by some structure), an organic binder material, such as a powdered thermoplastic or thermoset resin binder, can be used. Suitable organic binders are disclosed in European Patent Publication EP 0692616 A1. Where it is desired that the binder continue to hold the continuous-filament wool together at high service temperatures, an inorganic binder, such as colloidal silica, is used. It is to be understood that the addition of a binder in the nozzle is optional, and the products of the invention can be binderless, which means that there is less than 1 percent binder by weight, exclusive of any size material on the filaments, of the total product. When a resin powder is applied as a binder, the resin powder is preferably applied in an amount within the range of from about 3 to about 30 percent by weight of the continuous-filament wool.

The continuous-filament wool can be collected in any suitable manner. One method is to intercept the filaments in a container, such as a bag 24 held in a stand 26 or any other suitable device. Preferably, the bag is perforated so that air can be separated from the continuous-filament wool as it is being collected. The bag can be of any suitable material, such as a polyester film perforated with numerous tiny holes. The bag can also have an open net-like construction. Another device to collect the continuous-filament wool is a drum (not shown), which can either be perforated or unperforated. The bag 24 or the drum are both suitable for storing and transporting the continuous filament wool 14. Other devices for collecting, storing, and transporting the wool can also be used, as will be described below.

The material to be used to make the strand can vary with the requirements of the end product. A preferred material is glass, such as an E-glass. Ceramic fibers may also be used. Additionally, other inorganic fiber-producing materials, such as rockwool and basalt, can be used to the extent that they can be formed into continuous fibers. High-strength, reinforcement-type glasses are preferred. The material forming the filaments may optionally be an organic material, such as a polyethylene terephthalate material (PET), or a polyphenylene sulfate material (PPS).

The number of filaments in each strand can be selected for the optimum product characteristics desired. Strands of from 400 to 8000 filaments may be used. A preferred strand is a glass fiber roving having about 4000 filaments.

The fiber diameter of the individual filaments 16 can be of any size suitable for the desired use. Glass fibers may have diameters within the range of from about 9 to about 36 microns, although fibers having diameters outside this range could also be used if suitable for the intended purpose. A preferred fiber diameter is about 24 microns. During the glass fiber forming process the glass fibers may be coated with a conventional size which allows the fibers to unwind and to expand or fluff when blown with air. Generally, the size may contain a carrier solvent, normally water, a coupling agent, and a film-former material. The average fiber length from a continuous fiber forming process is relatively very long, and is expected to be, on the average, at least several meters, and may be up to several thousand meters. As used herein, the term "continuous filaments" is meant to include not only filaments that are practically infinite in length, but also discrete filaments having a length of at least 1 meter. In contrast, rotary fibers typically have an average length significantly less than 1 cm.

Figure 2:
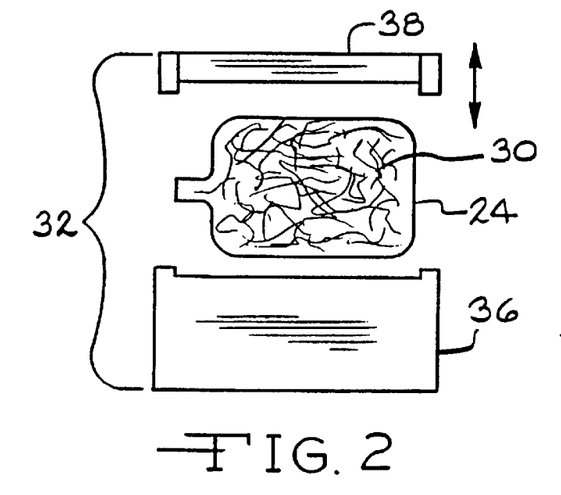
FIG. 2 is a schematic view in elevation of a compression mold for molding a charge of continuous-filament wool according to the invention.

As shown in FIG. 2, the continuous filament wool contained in the bag 24 can be used to place a charge 30 of continuous-filament wool into a compression mold 32. The compression mold can be any mold suitable for compressing and molding the charge to form a molded product, such as acoustical insulation product 34 shown in FIG. 3. The mold can have a base or bottom 36 and a top 38 mounted for movement toward the bottom 36 to compress the continuous-filament wool during the molding process. The mold top and bottom are provided with contoured or shaped surfaces (not shown) to impart the desired shape to the molded product. Optionally, the mold can be heated prior to or during the molding process to help cure any binder on the continuous-filament wool. The mold can also be provided with air passages (not shown) to enable hot curing air to be forced through the wool to cure the binder in a manner known in the molding art. Although the charge 30 is shown as being contained in the bag 24 during the molding process, the charge can be placed into the mold by itself (without the bag), or with any suitable surfacing agents or surfacing materials, such as a thin layer of asphalt, or a metal foil, e.g., if it is desired to form a composite or laminate product. Also, although it is preferred to apply the binder material in the nozzle 10 as shown in FIG. 1, the method of the invention can be carried out by applying a binder to the continuous-filament wool after the wool has been placed in the mold. Preferably, the continuous-filament wool has a binder content of no more than about 5 percent by weight, and after molding, the wool has a density within the range of from about 4 to about 20 pounds per cubic foot (64 to 320 g/l).

Figure 3:
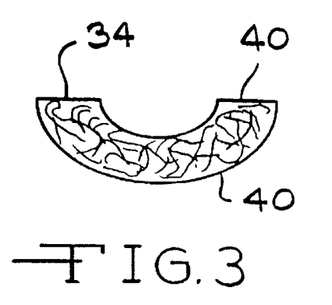
FIG. 3 is a cross-sectional view in elevation of an insulation product molded using the mold of FIG. 2.

The acoustical insulation product 34 shown in FIG. 3 has edges 40. The edges of the product are defined as the outermost 1 or 2 cm of the product. Preferably the density of the continuous filament wool at the edges 40 of the molded acoustical insulation product 34 is no more than about 150 percent of the average density of the molded acoustical insulation product.

Figure 4:
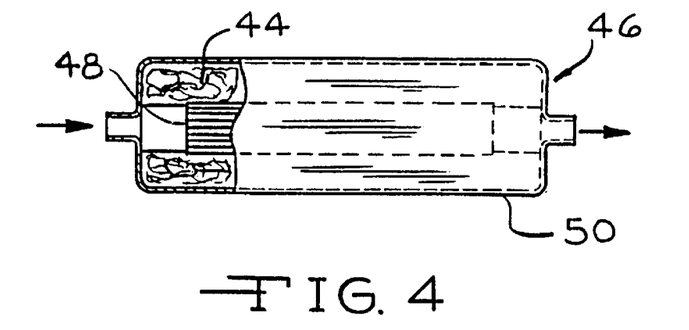
FIG. 4 is a cross-sectional view in elevation of a catalytic converter according to the invention.

As shown in FIG. 4, the continuous-filament wool can be formed into a thermal insulation layer 44 to insulate a catalytic converter 46. The thermal insulation layer can be molded in a process similar to that shown in FIG. 2. A binder material can be incorporated on the surface of the filaments. If the binder material is organic, it will burn off once the service temperature is reached. The catalytic converter 46 contains a core element 48, which is usually provided with numerous passages having a catalyst on their surfaces. The flow of automobile engine exhaust gases through the passages results in a cleaner discharge from the automobile in a well-known manner. The catalytic converter is provided with a cover 50.

The catalytic process is exothermic, typically producing temperatures in excess of 500° C. The thermal insulation layer protects the remainder of the vehicle from these extreme temperatures. One of the advantages of using the continuous-filament thermal insulation layer 44 as the thermal insulation material for the catalytic converter is that the layer 44 can be made of a high-temperature resistant material, such as E-glass. Other high-temperature fiber-forming materials having softening points of at least about 700° C. can be used. Examples include such glasses as S2-glass® and ZenTron™ (both available from Owens Corning), and R-glass® (available from CertainTeed). Preferred glass material is that disclosed in the U.S. patent application entitled "Continuous In-Line Process and Apparatus for the Production of High Temperature Glass Fibers and Rovings" filed Oct. 25, 1996, in the name of David Hartman, William T. Brady, David Stotler, and Susan Pierik, the disclosure of which is incorporated by reference herein. Another advantage, besides the ability to employ high service temperature, in using continuous-filament wool for the thermal insulation layer 44 is that the filaments, being continuous, will not become dislodged under the rigorous environment encountered during the life of the catalytic converter. The severe environment might include significant vibration and other mechanical shock, as well as gas pulsing or shocks, and thermal shocks due to rapid changes in temperature.

One of the advantages of the molded continuous-filament wool product of the invention is that good filament retention results can be obtained at lower densities than possible with the discrete-length filaments produced by a rotary process. Discrete-length filaments are filaments of a relatively short or finite length, as opposed to continuous filaments. When continuous-filament wool is molded absent a binder to a high enough density, the filament-to-filament frictional interaction will reduce loss or dislodging of the continuous filaments. This would be true even under adverse service conditions of vibration and gas pulsing, such as might be experienced by insulation products when used in an automobile muffler or as insulation for a catalytic converter. However, where rotary wool or wool of other short fibers is molded absent a binder to that same density, the filament-to-filament interaction of the discrete-length filaments is insufficient to prevent significant loss of the discrete fibers of the rotary wool under the same adverse service conditions of vibration and gas pulsing. The very long length of the continuous filaments helps prevent filament dislodgment, whereas the short rotary filaments become dislodged. For example, discrete-length ceramic fibers with no binder must be compressed to a density significantly greater than the density of continuous-filament wool for each product to gain the property of having no significant filament discharge under the adverse service conditions of vibration and gas pulsing. Therefore, the same product result can be obtained using much less continuous-filament wool.

Figure 5:
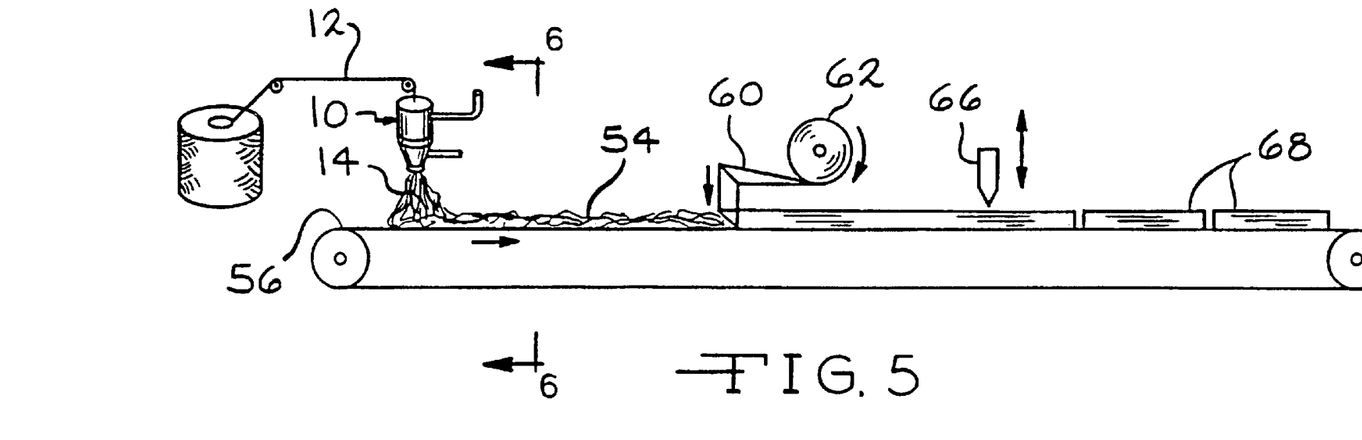
FIG. 5 is a schematic view in elevation illustrating the formation of a continuous blanket and the encapsulation of the continuous blanket according to the invention.
Figure 6:
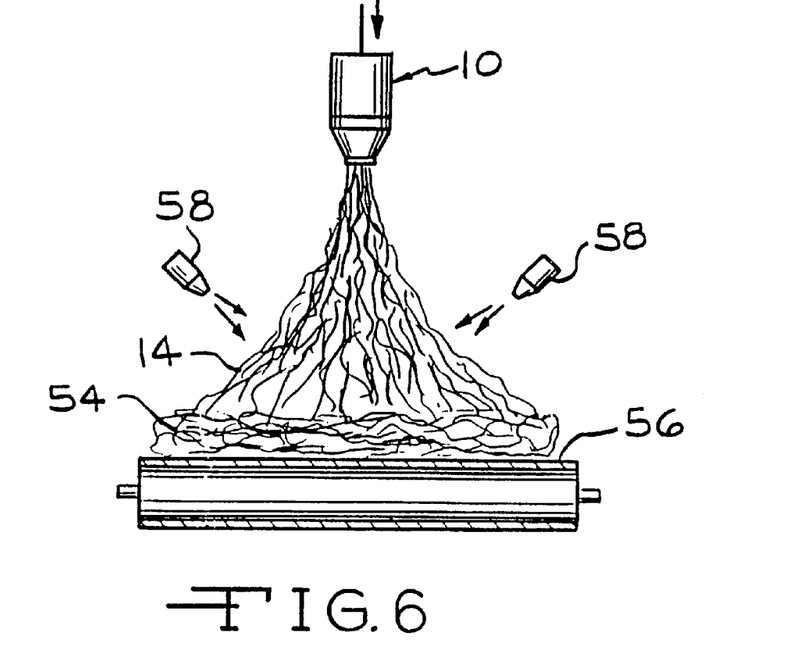
FIG. 6 is a view in elevation of the apparatus of FIG. 5 taken along line 6—6.

As shown in FIGS. 5 and 6, the method of the invention can be used to make a continuous blanket 54 from the continuous-filament wool 14. The multifilament strand 12 can be passed through a nozzle 10 as described above to separate the filaments from each other to create the wool 14. The continuous-filament wool is collected as the continuous blanket 54 on a conveyor 56. Any collection surface suitable for receiving the continuous-filament wool and forming the continuous blanket can be used. The continuous-filament wool being formed by the nozzle is distributed across the width of the of the conveyor 56 by the action of air jets 58. The air jets can be any pneumatic device appropriate for distributing the continuous-filament wool across the conveyor. Alternatively, oscillating mechanical baffles (not shown) could be used to distribute the fibers. Also, the nozzle 10 could be mounted for oscillation so that the wool could be distributed evenly across the conveyor. Further, although only a single nozzle 10 is shown in the drawings, the method of the invention could be readily carried out using an array of similar nozzles to effect distribution of the wool evenly across the width of the conveyor.

Figure 7:
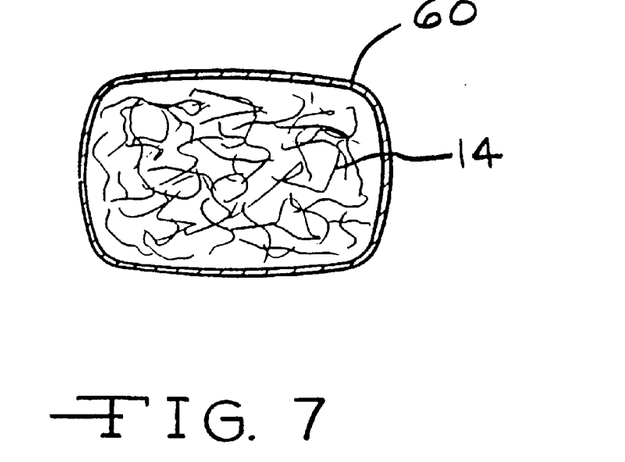
FIG. 7 is a cross-sectional view in elevation of the encapsulated product made according to the method shown in FIG. 5.

Once the continuous blanket is formed, it can be treated in several different ways for different desired results. One treatment process, shown in FIG. 5, is an encapsulation process in which a film, such as a polyester film 60, is continuously wrapped around the perimeter of the continuous blanket 54. The film can be supplied from a roll 62 and applied in any suitable, e.g., as disclosed in U.S. Pat. No. 5,545,279, the disclosure of which is hereby incorporated by reference. The resulting encapsulated blanket 64 can be cut by any suitable means, such as a chopper 66, to form an encapsulated insulation product 68 of predetermined shape. As shown in FIG. 7, the encapsulated product 68 contains the continuous filament wool 14, and has the encapsulation film 60 on its perimeter.

Figures 8, 9, 10, 11:
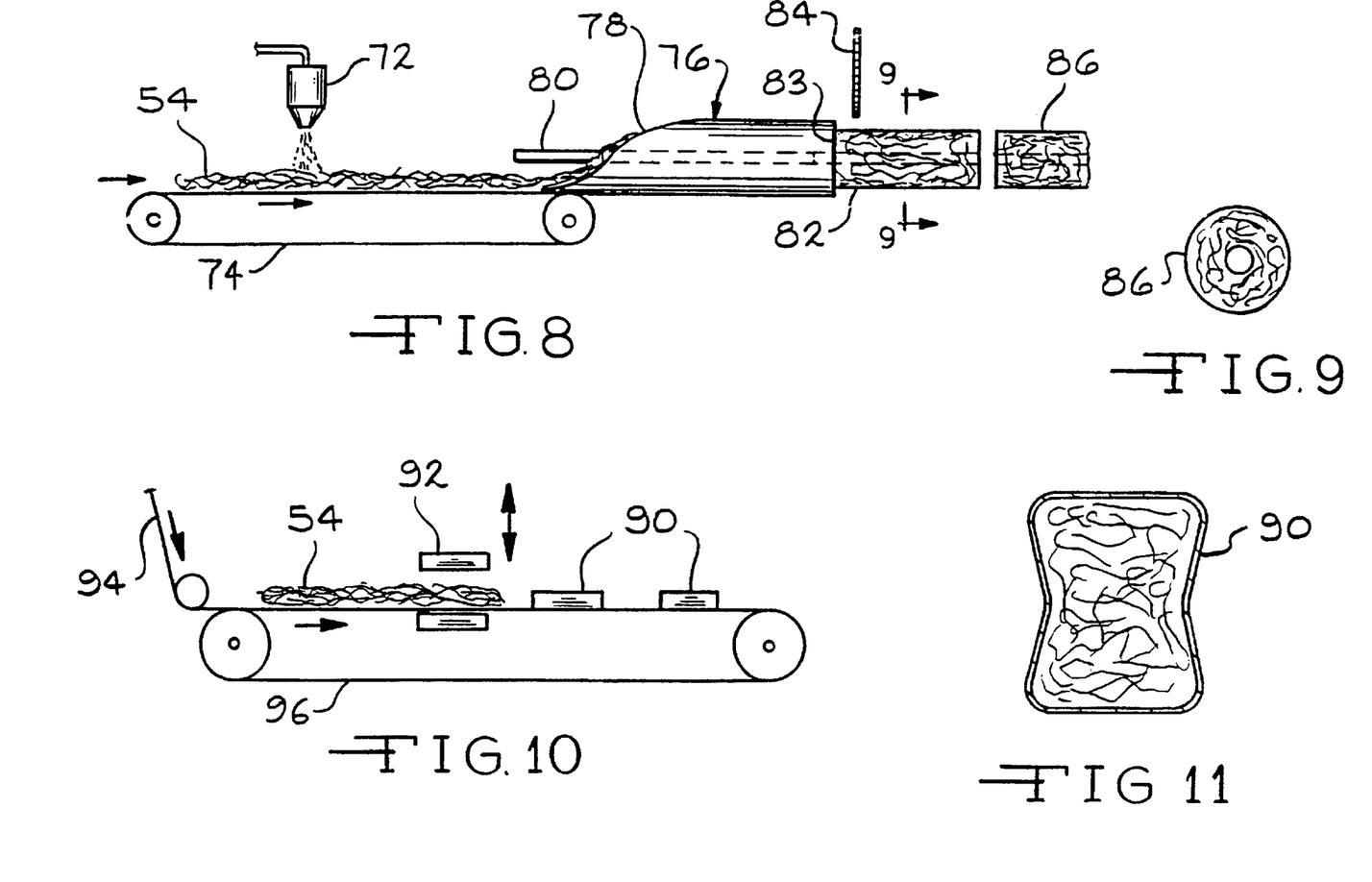
FIG. 8 is schematic view in elevation of a process for continuously making pipe insulation according to the invention.
FIG. 9 is a cross-sectional view in elevation of a pipe insulation product made according to the method shown in FIG. 8.
FIG. 10 is a cross-sectional view in elevation of a process for die-cutting a continuous blanket of continuous-filament wool according to the invention.
FIG. 11 is a plan view of an insulation product made by the process shown in FIG. 10.

The continuous molded pipe process shown in FIG. 8 includes an optional step of applying binder to the continuous blanket 54 with a binder nozzle 72. The continuous blanket is carried by the conveyor 74 and fed into the continuous pipe insulation molding apparatus 76. This apparatus includes a folding shoe 78 and a centered mandrel 80 to form a molded product of constant cross-sectional shape. Hot curing gases can be forced through the continuous-filament wool to cure the binder on the filaments. Once the hollow continuous molded pipe insulation 82 is moved beyond the end 83 of the molding apparatus 76, the continuous molded pipe insulation 82 can be cut by a saw 84 to form individual pipe insulation product 86. The pipe insulation product 86 has a hollow circular cross-section, as shown in FIG. 9. It can be appreciated that a process as shown in FIG. 8 can be used to mold or form products of continuous-filament wool having various predetermined cross-sectional shapes.

As shown in FIGS. 10 and 11, the continuous blanket 54 can be subjected to a die-cutting operation to form individual insulation products 90. The die has a die top 92 which is mounted to move vertically down onto the continuous blanket to cut it into the shape desired for the insulation products 90. As shown, a backing layer 94 can be added to the continuous blanket 54 as it travels along the conveyor 96. This backing layer could be formed of a suitable material to form the desired layer, such as a layer of asphalt suitable for providing a sound-energy barrier in an acoustical insulation system. Backing layers of numerous other materials may also be applied, and backing layers may be applied to both the top and the bottom of the continuous blanket. The individual insulation products 90 may be, for example, acoustical insulation blankets suitable for acoustically insulating air-conditioner compressors.

Figure 12:
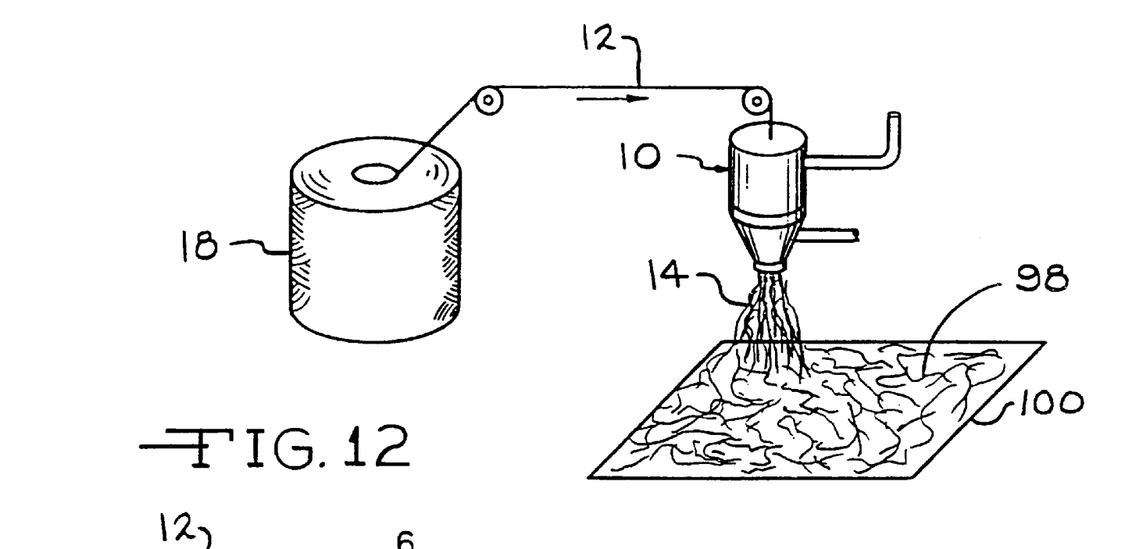
FIG. 12 is a schematic view in perspective of a process according to the invention for making a mat of continuous-filament wool from a roving package.

The process of making a mat 98 of continuous-filament wool 14 from a roving package 18 is shown in FIG. 12. The wool mat 98 may be any shape desired. The nozzle may be moved using known means to distribute the wool on a collection surface 100 according to a predetermined pattern. A binder may be applied either at the nozzle or on top of the mat. Alternatively, the mat may be binderless. The continuous-filament wool mat 98 can be used as input or a preform for a wool molding process, or can be used as a reinforcement material for a composite product.

The invention has been described in its preferred embodiments. Suitable modifications will become apparent to artisans through practice of the invention. Thus, the invention is intended not to be limited by the above detailed description, but to be defined by the appended claims and their equivalents.

What is claimed is:

1. A process of forming a thermal insulation layer comprising advancing a strand comprising continuous filaments composed of a glass material having a softening point of at least about 700° C. through a nozzle to separate the filaments from each other and form a continuous-filament wool, applying a binder material to the filaments, placing a charge comprising the continuous-filament wool in a compression mold, and compression molding the charge to form an insulation layer.

2. A process as defined in claim 1 in which the binder material is applied to the filaments as the filaments advance through the nozzle.

3. A process as defined in claim 1 in which the binder material is applied to the filaments after the charge is placed in the mold.

4. A process as defined in claim 1 further comprising preparing the charge by placing the continuous-filament wool in a polymeric bag.

5. A process as defined in claim 1 in which the binder material is applied in an amount yielding a content of no more than about 5 percent by weight.

6. A process as defined in claim 5 in which the continuous-filament wool has a density within the range of from about 4 to about 20 pounds per cubic foot (64 to 320 g/l).

7. A process as defined in claim 1, wherein the advancing step comprises the step of collecting the charge outside of the mold, and the placing step occurs after the charge is collected.

8. A process as defined in claim 7, wherein the charge is collected in a container.

9. A process as defined in claim 8, wherein the container comprises a bag.

10. A process as defined in claim 8, wherein the container comprises a drum.

* * * * *